United States Patent
Makhalin (10) Patent No.: US 11,027,924 B2
(45) Date of Patent: Jun. 8, 2021

(54) DEVICE FOR MOVING ENDLESS CONVEYOR CHAINS

(71) Applicant: Alexei Igorevich Makhalin, Moscow (RU)

(72) Inventor: Alexei Igorevich Makhalin, Moscow (RU)

(*) Notice: Subject to any disclaimer, the term of this patent is extended or adjusted under 35 U.S.C. 154(b) by 0 days.

(21) Appl. No.: 16/978,921

(22) PCT Filed: Sep. 17, 2018

(86) PCT No.: PCT/RU2018/000608
§ 371 (c)(1),
(2) Date: Sep. 8, 2020

(87) PCT Pub. No.: WO2020/017989
PCT Pub. Date: Jan. 23, 2020

(65) Prior Publication Data
US 2021/0047126 A1    Feb. 18, 2021

(30) Foreign Application Priority Data
Jul. 19, 2018   (RU) .......................... RU2018126640

(51) Int. Cl.
*B65G 17/12* (2006.01)
*B65G 17/38* (2006.01)
*B65G 23/06* (2006.01)

(52) U.S. Cl.
CPC .............. *B65G 17/12* (2013.01); *B65G 17/38* (2013.01); *B65G 23/06* (2013.01); *B65G 2201/0258* (2013.01)

(58) Field of Classification Search
CPC ........ B65G 17/12; B65G 17/38; B65G 23/16; B65G 23/14; B65G 15/10; B65G 15/12; B65G 17/385; B65G 23/06
USPC ................................................ 198/817, 729
See application file for complete search history.

(56) References Cited

U.S. PATENT DOCUMENTS

| | | | | |
|---|---|---|---|---|
| 3,057,456 | A * | 10/1962 | Heinzer | B65B 35/24 198/465.1 |
| 3,889,095 | A * | 6/1975 | Egan | B23K 26/702 219/121.82 |
| 4,162,723 | A * | 7/1979 | Kupper | B65G 17/002 198/444 |
| 4,613,034 | A | 9/1986 | Hibi et al. | |
| 5,069,327 | A | 12/1991 | Stohr et al. | |
| 6,170,647 | B1 * | 1/2001 | Miura | B65G 17/067 198/817 |
| 8,807,329 | B2 * | 8/2014 | Pierson | B65G 57/06 198/735.4 |
| 9,731,848 | B2 * | 8/2017 | Suzuki | B65B 5/045 |

(Continued)

FOREIGN PATENT DOCUMENTS

DE   2616094 U1   10/1976

*Primary Examiner* — James R Bidwell
(74) *Attorney, Agent, or Firm* — Nadya Reingand; Yan Hunkin (57) ABSTRACT

In the present device for moving endless conveyor chains, link conveyor chains are moved within C-shaped guides. Mounted in breaks in the guides is a chain actuating mechanism configured as two parallel chain drives. As the conveyor chains move, their rollers are engaged by grips disposed on the chain drives. The invention makes it possible to create a compact device for smoothly and evenly moving endless conveyor chains in different planes.

9 Claims, 7 Drawing Sheets

(56) References Cited

U.S. PATENT DOCUMENTS

2010/0072029 A1\* 3/2010 Reist .................... B65G 17/385
198/729
2012/0186613 A1\* 7/2012 Siegmund .............. B65G 39/20
134/56 R \* cited by examiner

DEVICE FOR MOVING ENDLESS CONVEYOR CHAINS

CROSS-REFERENCE TO RELATED APPLICATIONS

The present patent application is a U.S. National stage application of the PCT application PCT/RU2018/00608 filed Sep. 17, 2018 which claims priority to Russian patent application RU 2018126640 filed Jul. 19, 2018, currently issued as a patent RU 2688645, all of which are incorporated herein in their entirety.

FIELD OF INVENTION

The present invention relates to the movement of chain conveyors along the curved path located within three dimensions with chain gear rotating drive.

BACKGROUND

Closest to the claimed invention is RF patent for invention No. 2225338, "Flexible conveyor belt, climatic chamber containing such a belt, and a method of processing products in this chamber", IPC B65G 21/18, F25D 3/10, F25D 13/06. The invention is intended for the processing of food products transported on a conveyor belt in a climatic chamber. Flexible conveyor belt is made in the form of an endless loop. Part of it forms many layers superimposed on one another. The belt is assembled from mutually shifted links. Each of them contains at least two transverse rods and supporting elements located at each edge of the belt. The latter protrude upward from the plane of the belt and are made to support the overlying layer of belt. The links are connected to each other with the possibility of mutual displacement along at least one lateral edge of the belt. The supporting elements are connected to the ends of the transverse rods of the belt or form their continuation. They include a support part in the form of a bracket. The latter protrudes upward from the plane of the belt and interconnects the rods of the corresponding link of the belt. The climatic chamber for processing products by circulating gas around them contains the described conveyor belt.

The disadvantage of this technical solution is that the guides are made in the form of rollers, which limits the use of the conveyor chain and does not allow optimal use of the occupied space.

The objective of the invention is to provide a device for moving endless conveyor chains with smooth uniform movement in different planes without the use of guide sprockets with maximum use of usable areas.

SUMMARY

The problem is solved due to the fact that the device for moving endless conveyor chains includes conveyor chains made in the form of links; guides; at least one engine and at least one drive with a drive sprocket. Each conveyor chain is made in the form of interconnected links, where the estimated number of link connections are equipped with rollers, the dowels of which are elongated on one side. The guide is made in the form of a rigid C-shaped section in the profile, tightly covering the conveyor chain and located in such a way that the elongated parts of the roller dowels protrude from the opening of the C-shaped profile. The bends of the guide can be made in different planes, and the guides themselves are always made the same in shape and are arranged mirror-to-one with each other so that the elongated parts of the roller dowels of each guide are directed towards each other and synchronized with respect to each other. Each guide is made with a gap for mounting the drive. The drive is made in the form of a drive chain mechanism, which is mounted on the base and made in the form of two unconnected chain gears. Chain drives are parallel to each other and move in different directions relative to each other. The chain gears are driven by at least two drive sprockets engaged with their pair and chain gear sprockets. The inner part of each chain transmission is limited by a rack, U-shaped in section, fixed on the base and deployed with its open part inward. The outer part of each chain transmission is equipped with at least one chain tensioner. The chain of each chain transmission is equipped with an estimated number of grips located at the same distance from each other. Each grip of one chain is synchronized with respect to each grip of the second chain, and the distance between the grips is equal to the distance between the rollers of the conveyor chain. Grips are made with the possibility of bilateral grip and movement of the rollers. There can be four drive sprockets in the drive chain mechanism. The grips are made in the form of a one-sided or two-sided element pushing roller. The drive chain mechanism can be installed on any straight section of an endless conveyor chain. You can install several drive chain mechanisms to any straight sections of an endless conveyor chain. When installing several drive chain mechanisms, only one of the many drive chain mechanisms can contain an engine, while two chain mechanisms, one of which contains an engine, are installed in parallel and are joined by a motion-transmitting shaft connecting one of the sprockets of one of the chain gears to the sprocket of a parallel chain gear a parallel chain mechanism that transmits movement, and the remaining chain mechanisms are joined with chain mechanisms containing a shaft by means of drive chains. The estimated number of connections of the links of the conveyor chain can be equipped with additional rollers on the outer side of the chain. The number of rollers for the links of the conveyor chain is calculated in accordance with the expected load.

BRIEF DESCRIPTION OF THE DRAWINGS

The essence of the proposed invention is clarified with drawings, where.

DETAILED DESCRIPTION OF THE PREFERRED EMBODIMENT

Figure 1:
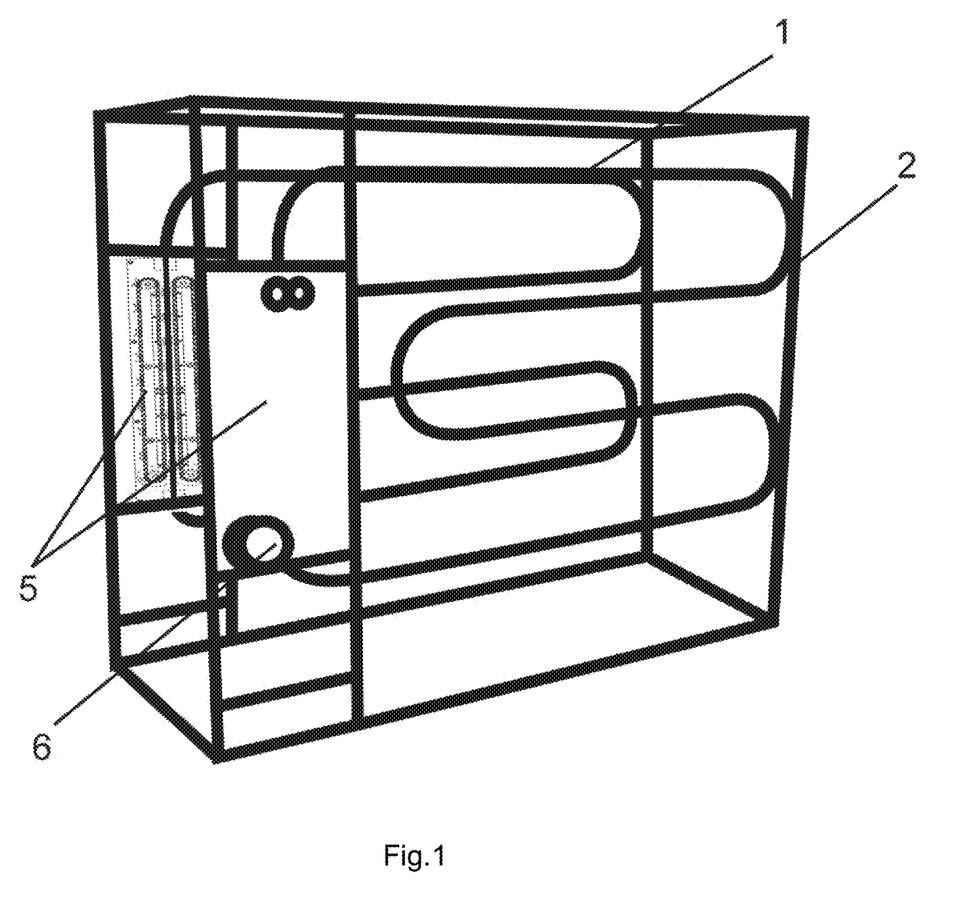
FIG. 1—View of device for moving endless conveyor chains with two drives.
Figure 2:
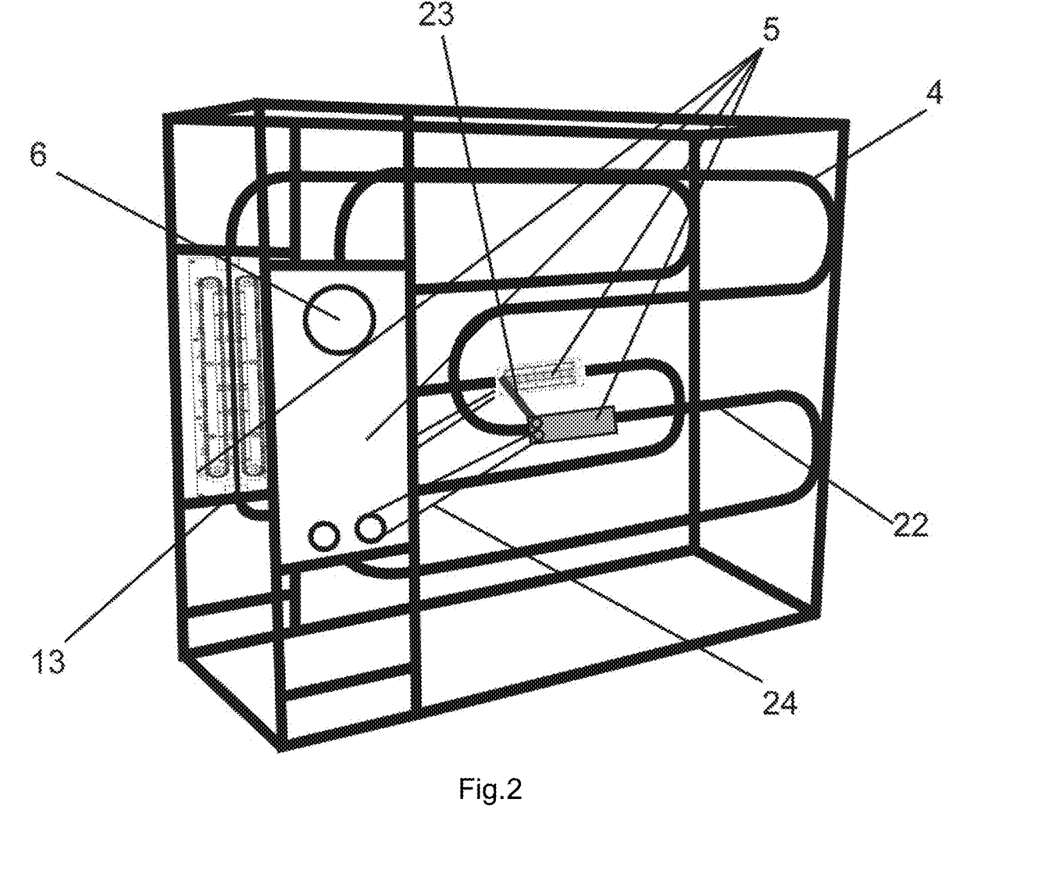
FIG. 2—View of device for moving endless conveyor chains with four drives and one engine.
Figure 3:
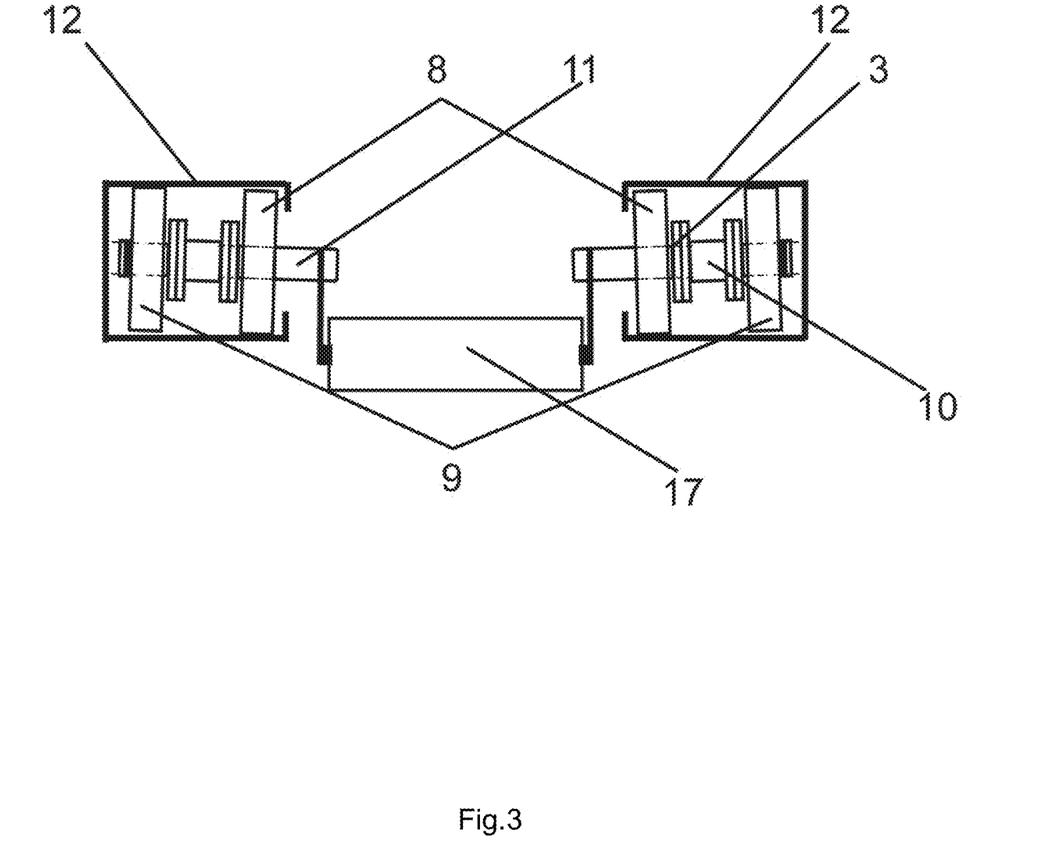
FIG. 3—Sectional view of guides with rollers and twin rollers.
Figure 4:
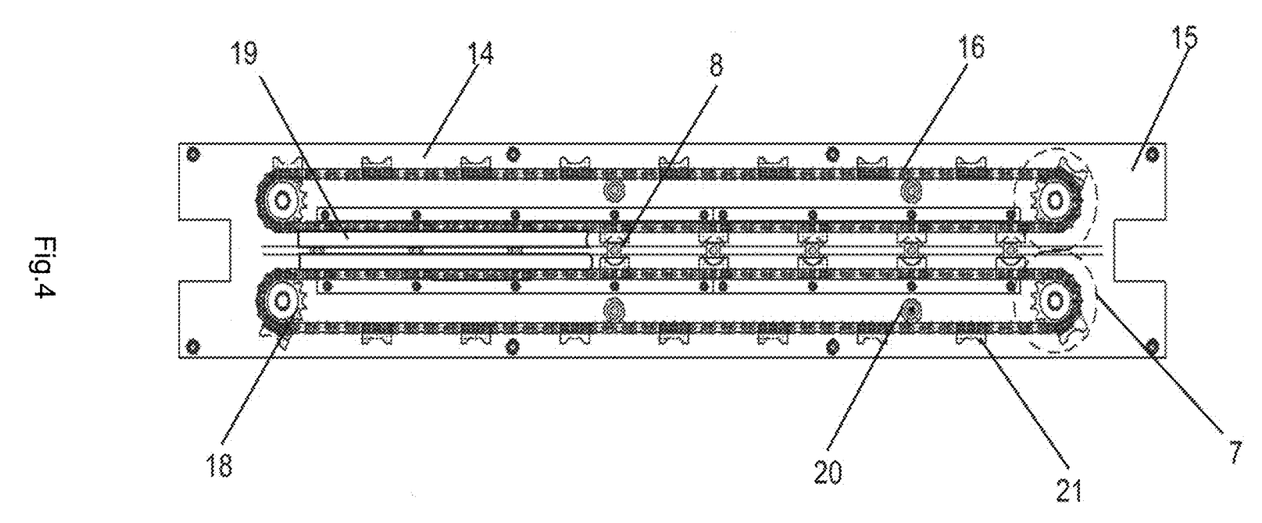
FIG. 4—View of drive chain mechanism.
Figure 5:
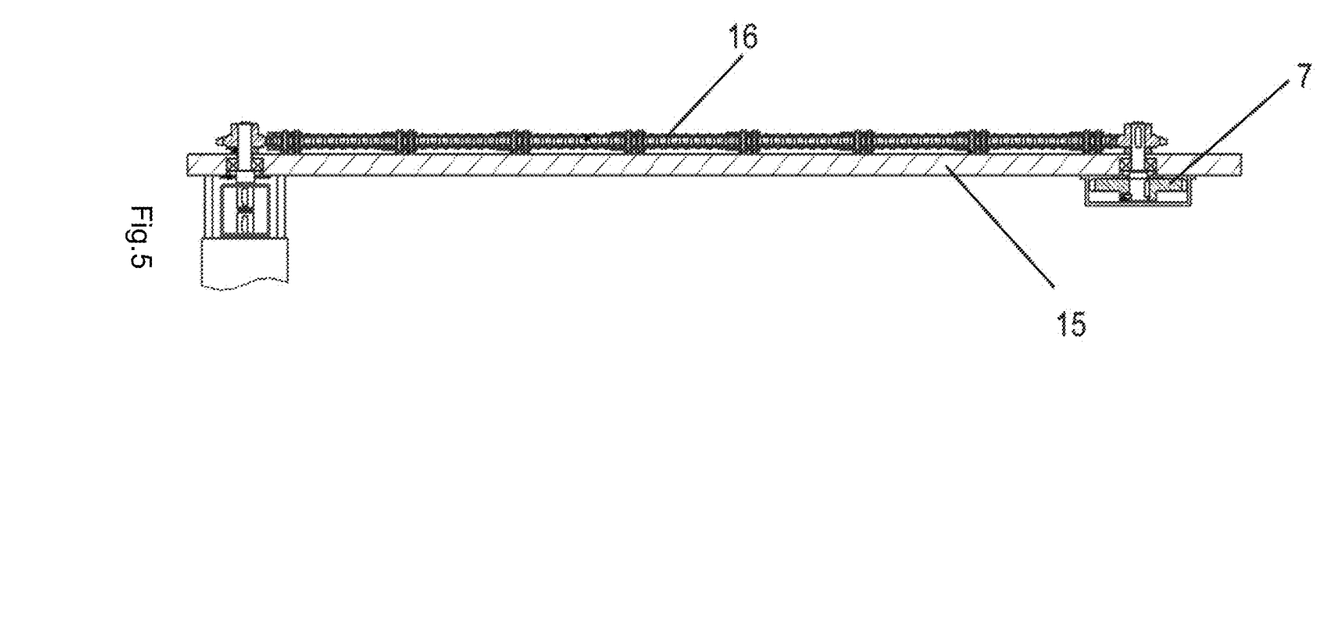
FIG. 5—View of the drive chain mechanism with drive sprockets located on opposite to engine side.
Figure 6:
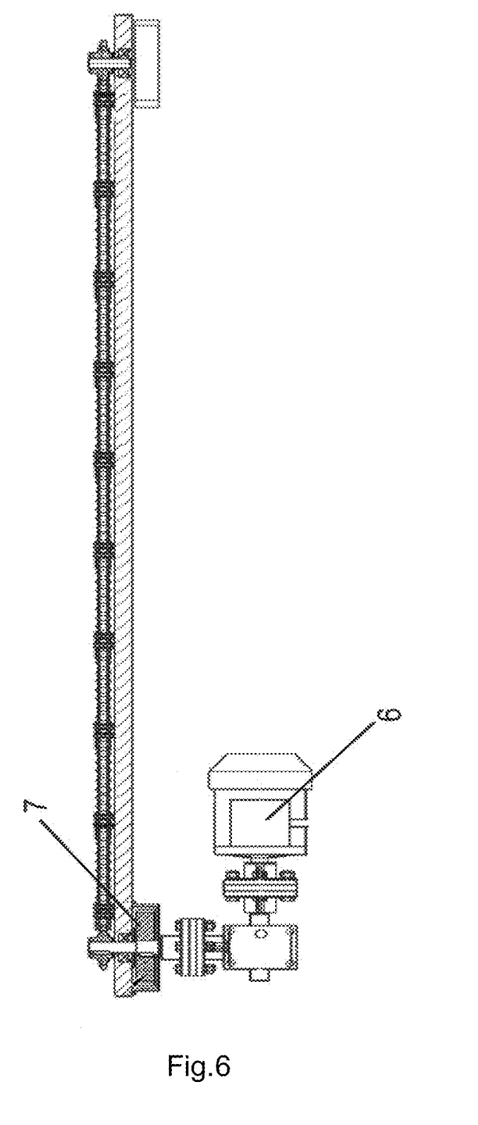
FIG. 6—View of the drive chain mechanism with drive sprockets located on the engine side.
Figure 7:
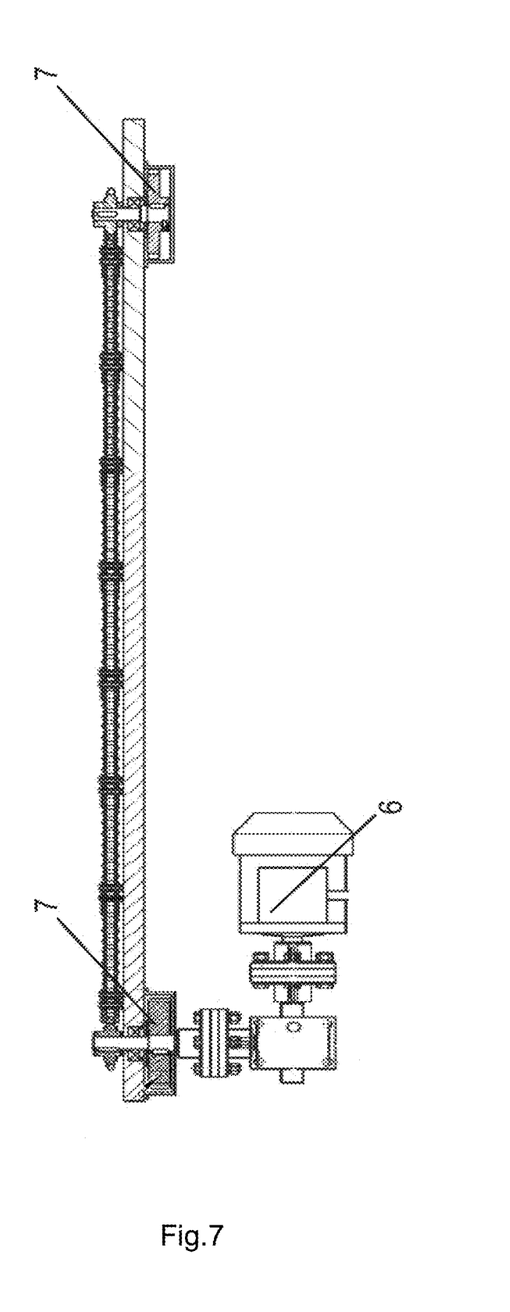
FIG. 7—View of the drive chain mechanism with drive sprockets located on the engine side and on opposite to engine side.

A device for moving endless conveyor chains includes conveyor chains made in the form of links; guides; at least one engine and at least one drive with a drive sprocket. (see FIG. 1, 2)

Each conveyor chain is made in the form of interconnected links, where the estimated number of link connections are equipped with rollers, the dowels of which are elongated on one side. The guide is made in the form of a rigid C-shaped section in the profile, tightly covering the conveyor chain and located in such a way that the elongated parts of the roller dowels protrude from the opening of the C-shaped profile. The bends of the guide can be made in different planes, and the guides themselves are always made the same in shape and are arranged mirror-to-one with each other so that the elongated parts of the roller dowels of each guide are directed towards each other and synchronized with respect to each other. Each guide is made with a gap for installing the drive (see FIGS. 1, 3, 4, 5)

The estimated number of connections of the links of the conveyor chain can be equipped with additional rollers on the outer side of the chain. The number of rollers for the links of the conveyor chain is calculated in accordance with the expected load. In this case, additional rollers are installed in the links of the conveyor chain to improve safety, namely, to eliminate friction and scratching inside the C-shaped section profile. Improving the safety of the C-shaped profile is provided by a counterweight created by each additional roller. At the moment when, for example, the tray weighs on the dowels and presses down on the inner ends of the roller dowels, the other ends of the dowels with additional rollers create a counterweight, thereby ensuring independent rotation of the inner roller (see FIG. 3)

The drive is made in the form of a drive chain mechanism, which is mounted on the base and made in the form of two unconnected chain gears. Chain drives are parallel to each other and move in different directions relative to each other. The chain gears are driven by at least two drive sprockets engaged with their pair and chain gear sprockets. The inner part of each chain transmission is limited by a rack, U-shaped in section, fixed on the base and deployed with its open part inward. The outer part of each chain transmission is equipped with at least one chain tensioner. The chain of each chain transmission is equipped with an estimated number of grips located at the same distance from each other. Each grip of one chain is synchronized with respect to each grip of the second chain, and the distance between the grips is equal to the distance between the rollers of the conveyor chain. There can be four drive sprockets in the drive chain mechanism. The drive chain mechanism can be installed on any straight section of an endless conveyor chain. You can install several drive chain mechanisms to any straight sections of an endless conveyor chain. When installing several drive chain mechanisms, only one of the many drive chain mechanisms can contain an engine, while two chain mechanisms, one of which contains an engine, are installed in parallel and joined by a motion-transmitting shaft connecting one of the sprockets of one of the chain gears to the sprocket of a parallel chain gear in a parallel chain mechanism transmitting movement, and the remaining chain mechanisms are joined with chain mechanisms containing a shaft by means of drive chains. (see FIG. 4, 5, 6, 7)

Grips are made with the possibility of bilateral grip and movement of the rollers. The grips are made in the form of a one-sided or two-sided roller pushing element (see FIG. 4)

Advantages Versus Prototype:

A device for moving endless conveyor chains is universal and can be used in various industries from moving suspended loads, such as a greenhouse, to moving heavy wide loads, such as wood drying kiln, etc.

A device for moving endless conveyor chains is made in such a way that, depending on the industrial purpose, it can be made in various configurations: both using single drive or several, and also when installing multiple drives, the device can be equipped with one engine for all drives, or each drive has its own engine.

A device for moving endless conveyor chains is made using no conveyor chain guide sprockets making the design easier and cheaper.

A device for moving endless conveyor chains is made with optional maximal use of space achieved by using no guide sprockets of the conveyor chain and using C-shaped section profile.

All of the above indicates the fulfillment of the technical task and the industrial applicability of the claimed device for moving endless conveyor chains.

THE LIST OF POSITIONS

1. Device for moving infinite conveyor chains
2. Conveyor chain
3. Conveyor chain links
4. Guide
5. Drive
6. Engine
7. Drive sprocket
8. Roller
9. Additional roller
10. Dowel
11. A dowel extended on one side.
12. C-shaped section profile.
13. Gap for drive installation.
14. Drive chain mechanism.
15. Base
16. Chain transmission (i.e., unconnected chain transmissions)
17. Tray
18. Chain transmission sprocket
19. U-shaped sectional rack
20. Chain tensioner
21. Grab (i.e., one- or two-sided roller-pushing element)
22. Straight section
23. Shaft
24. Drive chain

What is claimed is:

1. A device for moving endless conveyor chains, including conveyor chains made in a form of links connected to at least one engine and at least one drive with a drive sprocket, characterized in that:

each conveyor chain is made in the form of interconnected links, where an estimated number of link connections is equipped with rollers, dowels of which are elongated on one side, while a guide is made in a form of a rigid C-shaped section profile, tightly covering the conveyor chain and located in such a way that elongated roller dowel parts protrude from a C-shaped profile opening, and guide bends can be made in different planes, and the guides themselves are always made identically shaped and are mirrored in relation to each other in such a way that the elongated roller dowel parts of each rail are directed towards each other and synchronized relative to each other, with each guide being made with a gap for mounting the drive, while the drive itself is made in a form of a drive chain mechanism, which is fixed on a base and made in a form of two unconnected chain transmissions whose gears are located parallel to each other and rotate in different directions relative to each other, while the chain gears are driven by at least two drive sprockets engaged with their pair and chain sprockets, an inner part of each chain gear being guided via a rack having a U-shaped cross-section, the rack being fixed to the base and turned with its open part inward, an outer part of each chain gear is equipped with at least one chain tensioner, while the chain of each chain gear is provided with an estimated number of grips located at an equal distance from each other, each grip of each chain is synchronized relative to each grip of another chain, wherein a distance between the grips equals a distance between rollers of the conveyor chain, and wherein the grips are capable of bilateral gripping and rollers moving.

2. The device for moving endless conveyor chains according to claim 1, characterized in that there are four drive sprockets in the drive chain mechanism.

3. The device for moving endless conveyor chains according to claim 1, characterized in that the grips are made in a form of a one-sided roller-pushing element.

4. The device for moving endless conveyor chains according to claim 1, characterized in that the grips are made in a form of a two-sided roller-pushing element.

5. The device for moving endless conveyor chains according to claim 1, characterized in that the drive chain mechanism is installed on any straight section of the endless conveyor chain.

6. The device for moving endless conveyor chains according to claim 1, characterized in that several drive chain mechanisms are installed on any straight sections of the endless conveyor chain, and each drive chain mechanism is equipped with an engine.

7. The device for moving endless conveyor chains according to claim 6, characterized in that several drive chain mechanisms are installed on any straight sections of the endless conveyor chain, and only one of the drive chain mechanisms contains the engine, while two chain mechanisms, one of which contains the engine are mounted in parallel and joined by a motion-transmitting shaft connecting one of the sprockets of one of the chain gears to the sprocket of a parallel chain gear of a parallel motion transmitting chain mechanism, while remaining chain mechanisms are joined with the chain mechanisms containing a shaft by means of drive chains.

8. The device for moving endless conveyor chains according to claim 1, characterized in that the estimated number of the conveyor chain link connections are provided with additional rollers on the outer side of the chain.

9. The device for moving endless conveyor chains according to claim 1, characterized in that the number of conveyor chain link rollers is calculated in accordance with an expected load.

* * * * *